US012224494B2

(12) United States Patent
Fraysse et al.

(10) Patent No.: US 12,224,494 B2
(45) Date of Patent: Feb. 11, 2025

(54) QUASI-OPTICAL BEAM FORMER WITH SUPERPOSED PARALLEL-PLATE WAVEGUIDE

(71) Applicant: THALES, Courbevoie (FR)

(72) Inventors: Jean-Philippe Fraysse, Toulouse (FR); Léonin Lassauce, Epinal (FR); Ségolène Tubau, Toulouse (FR); Hervé Legay, Plaisance du Touch (FR)

(73) Assignee: THALES, Courbevoie (FR)

( * ) Notice: Subject to any disclaimer, the term of this patent is extended or adjusted under 35 U.S.C. 154(b) by 211 days.

(21) Appl. No.: 18/102,052

(22) Filed: Jan. 26, 2023

(65) Prior Publication Data

US 2023/0238710 A1 Jul. 27, 2023

(30) Foreign Application Priority Data

Jan. 27, 2022 (FR) ....................................... 2200694

(51) Int. Cl.
*H01Q 19/10* (2006.01)

(52) U.S. Cl.
CPC .................................. *H01Q 19/10* (2013.01)

(58) Field of Classification Search
CPC ...... H01Q 19/10; H01Q 19/06; H01Q 3/2664; H01Q 9/045; H01Q 21/0031; H01Q 25/008
See application file for complete search history.

(56) References Cited

U.S. PATENT DOCUMENTS

| | | | | |
|---|---|---|---|---|
| 7,724,197 | B1 | 5/2010 | Hardie et al. | |
| 2012/0092224 | A1 | 4/2012 | Sauleau et al. | |
| 2016/0285165 | A1 | 9/2016 | Legay et al. | |
| 2017/0162943 | A1* | 6/2017 | Legay ................ | H01Q 15/0033 |

FOREIGN PATENT DOCUMENTS

WO 2013/110793 A1 8/2013

OTHER PUBLICATIONS

Allen, "A theoretical limitation on the formation of lossless multiple beams in linear arrays", IRE Transactions on Antennas and Propagation, vol. 9, Issue: 4, pp. 350-352, Jul. 1961.
Ettorre, et al., "Reconfigurable Multi-Beam Pillbox Antenna for Millimeter Wave Automotive Radars", 2009 9th International Conference on Intelligent Transport Systems Telecommunications, (ITST), pp. 87-90, 2009.

* cited by examiner

*Primary Examiner* — Hoang V Nguyen
(74) *Attorney, Agent, or Firm* — BakerHostetler

(57) ABSTRACT

A quasi-optical beam former includes a set of beam ports, a set of network ports, a quasi-optical device and at least one parallel-plate waveguide extending between the beam ports and the network ports, the beam ports and/or the network ports being superposed in at least two stages, each of the at least two stages being separated by a conductive plane common to two adjacent stages, the quasi-optical beam former comprising a resistive film placed in the continuity of the conductive plane.

15 Claims, 16 Drawing Sheets

QUASI-OPTICAL BEAM FORMER WITH SUPERPOSED PARALLEL-PLATE WAVEGUIDE

CROSS-REFERENCE TO RELATED APPLICATION

This application claims priority to foreign French patent application No. FR 2200694, filed on Jan. 27, 2022, the disclosure of which is incorporated by reference in its entirety.

FIELD OF THE INVENTION

The invention generally relates to the field of telecommunications, and in particular to quasi-optical beam formers (QOBF) for multibeam active antennas.

BACKGROUND

Quasi-optical beam formers may be installed on board satellites or in ground stations. Antennas using such formers may operate in transmission mode or in reception mode, reciprocally.

A quasi-optical beam former is a focusing (reception mode) and collimating (transmission mode) device. FIG. 1 shows a prior-art quasi-optical beam former applicable for example to pillbox, Rotman-lens or continuous-delay-lens beam formers. A quasi-optical beam former conventionally incorporates a parallel-plate guide 16, linking beam ports 17 and network ports 18. The parallel-plate waveguide 16 makes it possible for waves to be guided in TEM mode (TEM being the acronym of Transverse ElectroMagnetic), in which mode the electric field E and the magnetic field H vary in directions perpendicular to the direction of propagation X.

The wavefronts are curved in the XY plane. In order to compensate for the curvature of the wavefront, a quasi-optical device 23 is inserted between the beam ports and the network ports. This quasi-optical device may for example be a lens such as used in continuous-delay-lens beam formers or a reflector such as used in pillbox beam formers. Each network port 18 is connected to an amplifier 19 followed by a radiating element 20 by a delay line 21 and an amplifier port 22. It converts the cylindrical waves emanating from the beam ports into planar waves radiated by the radiating panel of the multibeam active antenna.

Quasi-optical beam formers produce multiple beams that are aligned along an axis, and that usually overlap at a gain level that may be as much as 10 dB lower than the maximum gain of the beams, as illustrated in FIG. 2. Such limitations are conventional and usually observed in any multibeam antenna associating an optical system (for example a reflector, a lens) and a focal array of multiple passive sources, each thereof defining one spot-beam feed.

This level of overlap of the beams is a result of a compromise in respect of the size of these sources, which must meet two opposing constraints: on the one hand, they must be large enough to adequately irradiate the optical system, and thus avoid spin-over losses, and on the other hand, they must be close together enough for the beams to overlap.

When a geographic region is covered by an antenna producing this beam overlap, certain ground stations are then exposed to an antenna gain decreased by these overlap losses. It is therefore desirable to minimize these overlap losses, and therefore to produce multiple beams that overlap at a high gain level.

A number of solutions have been envisaged with a view to minimizing losses related to the overlap of the beams.

It is for example known to use two quasi-optical beam formers with inserted sources, as for example disclosed in patent application WO 2013/110793 A1. Use of these two formers allows beam density in a given angular sector to be doubled. This solution however requires two quasi-optical beam formers, and a combining stage. This results in a greater mass, and a very substantial increase in complexity in the case of two-dimensional beam formation.

Other solutions use smaller sources with scanning recombination of two adjacent sources, as disclosed in the article "A theoretical limitation on the formation of lossless multiple beam antennas" (J. L. Allen, IRE Trans., 1961, AP-9, pp. 350-352). This approach makes it possible to produce equivalent sources that are large enough and that are superposed partially so that the associated beams overlap at a higher level. However, this solution requires a circuit associating divider and combiner to be added, this complexifying the beam former and generating additional losses.

In other solutions, apodization of the signal on the output ports is used to widen the main lobe of each beam while decreasing the level of their side lobes. Widening the main lobe allows a better overlap of the beams to be achieved but does not allow additional beams to be added. To perform this apodization, it is necessary to modulate the amplitude of the output signal as a function of the position of the radiating element in the array. This may be done passively using attenuators or indeed actively with a variable amplification as a function of the position of each element in the lattice of the array. This solution however leads to a decrease in the gain of the active antenna, for a given number of radiating elements, and is therefore undesirable.

In another approach described in the article "Reconfigurable Multi-Beam Pillbox Antenna for Millimeter Wave Automotive Radars" (M. Ettorre, R. Sauleau, Proc. ITST, pp. 87-90, 2009), sources are superposed in two different levels, this however generating substantial coupling between the feeds.

FIG. 3 illustrates in simplified form the operation of an E-plane combiner/divider, in which the sources are superposed in two different levels (Port 1 and Port 2; Port 3 corresponds to the output port). The achieved uneven-mode operating performance clearly shows the poor isolation between the input ports and the poor match of the excited input port (the E-field lines are not rectilinear).

There is a need for improved quasi-optical beam formers capable of minimizing losses related to overlap of the beams, without significant increase in complexity and/or bulk.

SUMMARY OF THE INVENTION

One subject of the invention is therefore a quasi-optical beam former comprising a set of beam ports, a set of network ports, a quasi-optical device and at least one parallel-plate waveguide extending between the beam ports and the network ports, the beam ports and/or the network ports being superposed in at least two stages, each of the at least two stages being separated by a conductive plane common to two adjacent stages, the quasi-optical beam former comprising a resistive film placed in the continuity of the conductive plane.

Advantageously, the quasi-optical beam former comprises a plurality of superposed parallel-plate waveguides, each superposed parallel-plate waveguide being placed facing the beam ports and/or facing the network ports of a given stage, the beam former further comprising a common parallel-plate waveguide, placed in the continuity of the superposed parallel-plate waveguides, the resistive film being placed at the junction between each superposed parallel-plate waveguide and the common parallel-plate waveguide.

Advantageously, the resistive film is adjacent to the beam ports.

Advantageously, the resistive film is adjacent to the network ports.

Advantageously, each beam port having an identical width between two consecutive beam ports of the same stage, the beam ports of two adjacent superposed stages are shifted by the width of the beam port divided by the number of stages of beam ports.

Advantageously, the beam ports are superposed in at least four stages, the length of each conductive plane in the direction of propagation of a wave through the quasi-optical beam former being variable from one stage to the next.

Advantageously, the beam ports have different dimensions, from one stage to the next.

Advantageously, each network port having an identical width between two consecutive network ports of the same stage, the network ports of two adjacent superposed levels are shifted by the width of the network port divided by the number of stages of network ports.

Advantageously, the network ports of a stage are configured to all be coupled to one antenna, and the network ports of a superposed adjacent stage are configured to all be coupled to a load not connected to the antenna.

Advantageously, the quasi-optical beam former comprises, on each of the lateral edges, a plurality of absorbing devices configured to absorb energy not transmitted between the beam ports and the network ports, said absorbing devices being superposed in the at least two stages, the position of the absorbing devices being shifted by a distance corresponding to $\lambda_g/4$, where $\lambda_g$ designates the wavelength guided in the quasi-optical beam former, the resistive film being placed between the absorbing devices of two superposed stages.

Advantageously, the absorbing devices comprise dummy ports or an absorber.

Advantageously, the network ports and/or the beam ports comprise coaxial lines, coaxial guides, striplines or microstrips.

Advantageously, the quasi-optical beam former takes the form of a multilayer printed circuit board (PCB), the parallel-plate waveguide being filled with a dielectric, the beam ports being produced in SIW technology.

The invention also relates to an active antenna comprising a quasi-optical beam former such as mentioned above, and a plurality of radiating elements connected to the output of said beam former.

Advantageously, the dimensions of the network ports are smaller than the dimensions of the radiating elements.

BRIEF DESCRIPTION OF THE DRAWINGS

Other features, details and advantages of the invention will become apparent on reading the description given with reference to the appended drawings, which are given by way of example.

DETAILED DESCRIPTION

Figure 1:
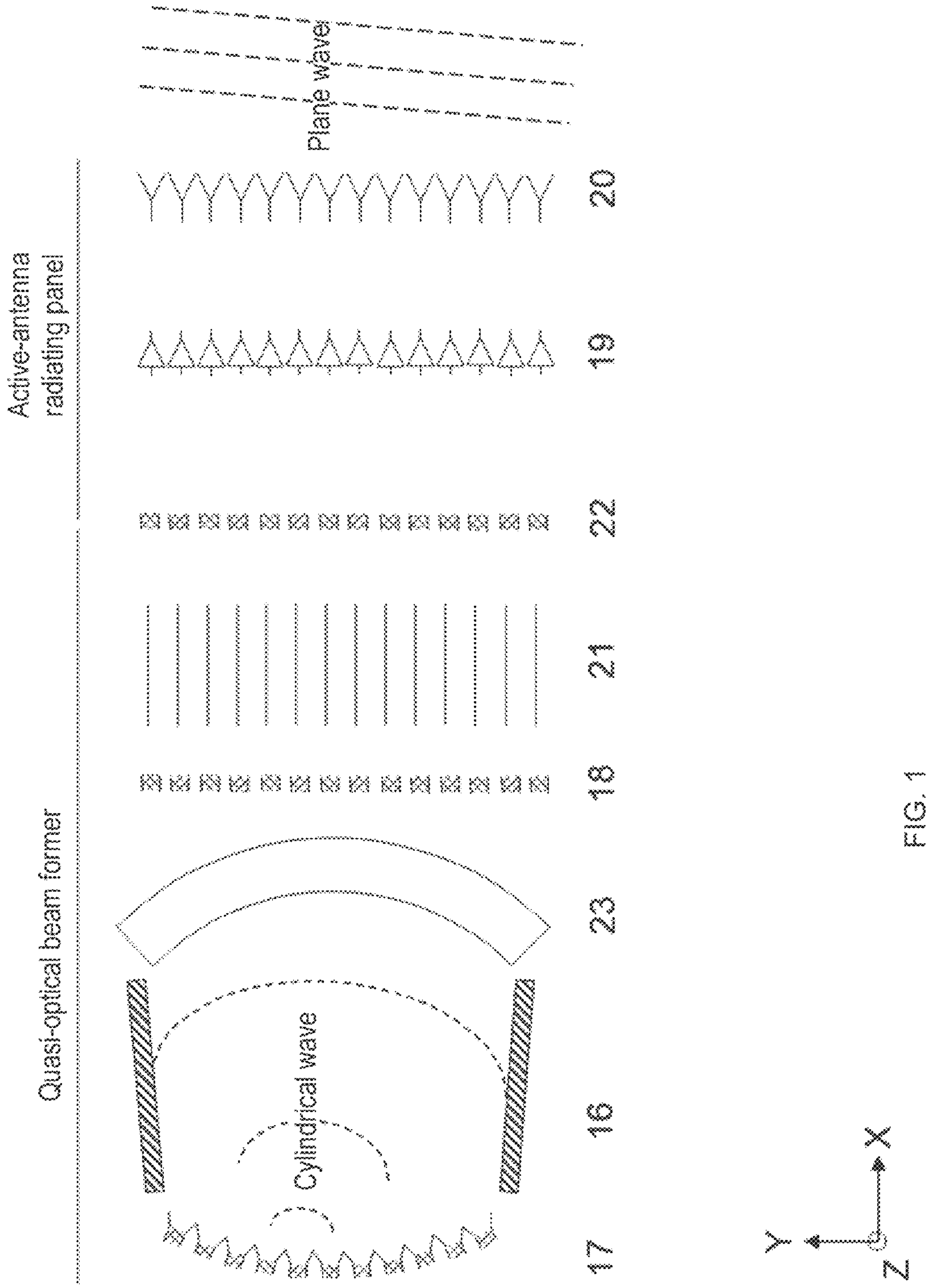
FIG. 1 illustrates an antenna comprising a quasi-optical beam former according to the prior art.
Figure 2:
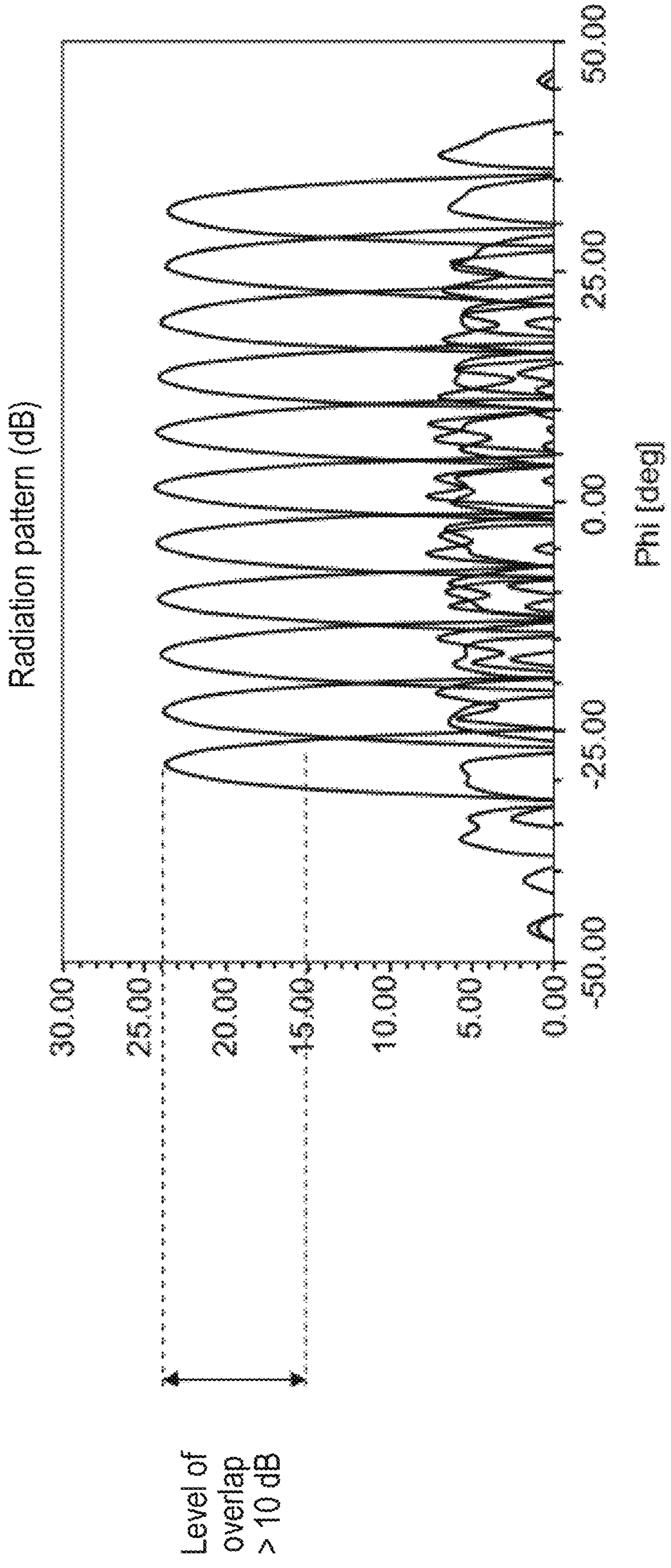
FIG. 2 illustrates the radiation pattern for various pointing angles, with a quasi-optical beam former according to the prior art.
Figure 3:
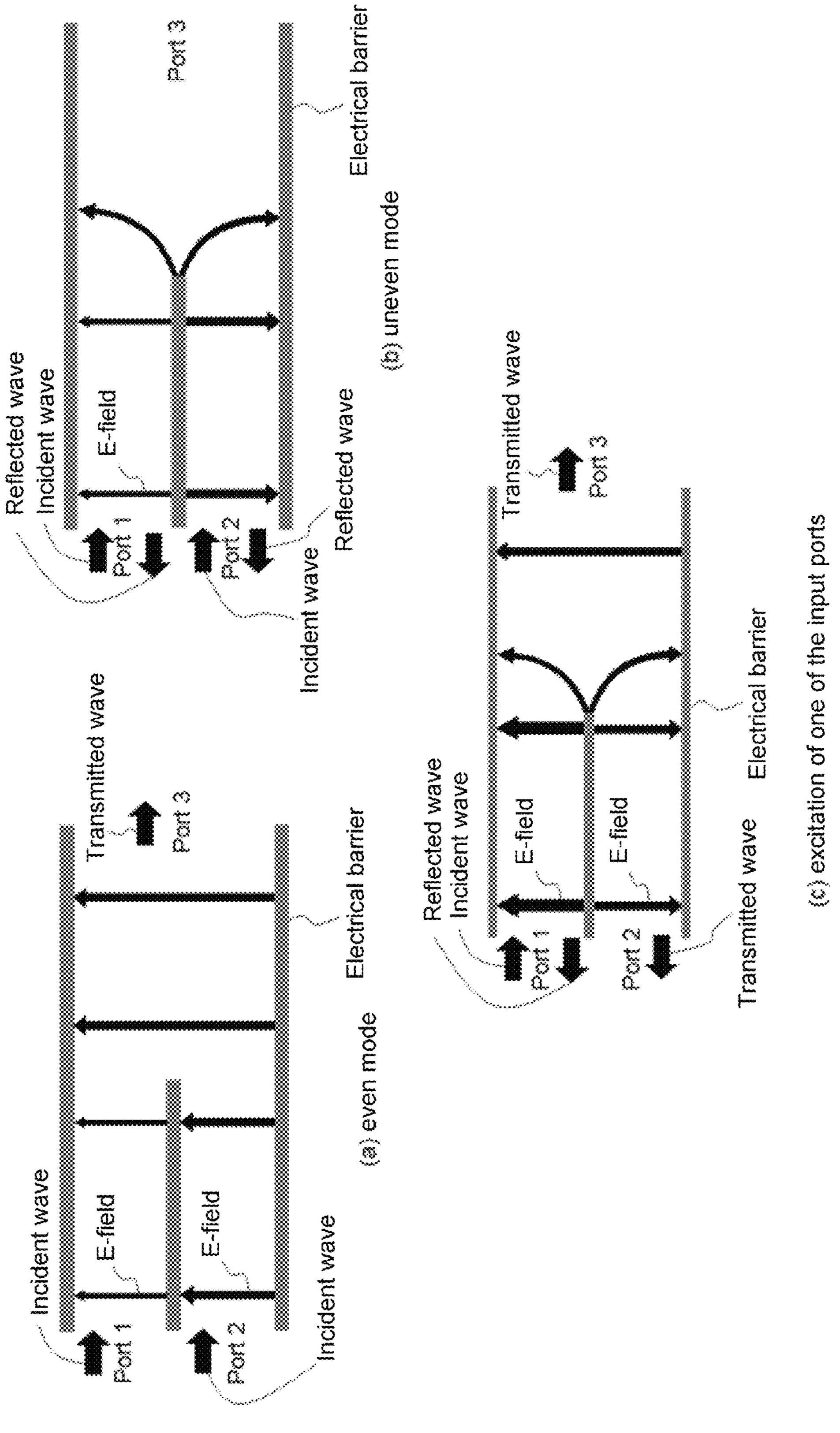
FIG. 3 illustrates a plurality of schematic representations of the operation of an E-plane combiner according to the prior art.
Figure 4:
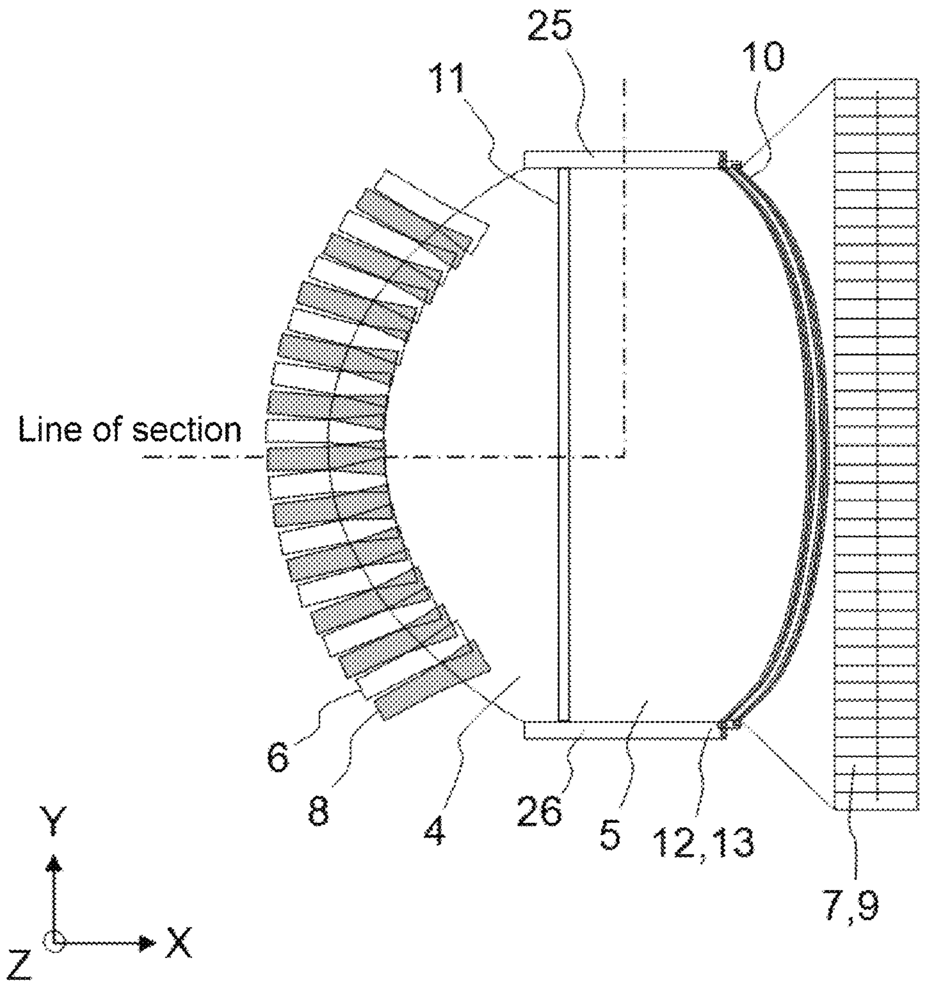
FIG. 4 illustrates a view from above (parallel to the XY plane) of the quasi-optical beam former according to one embodiment of the invention.
Figure 5:
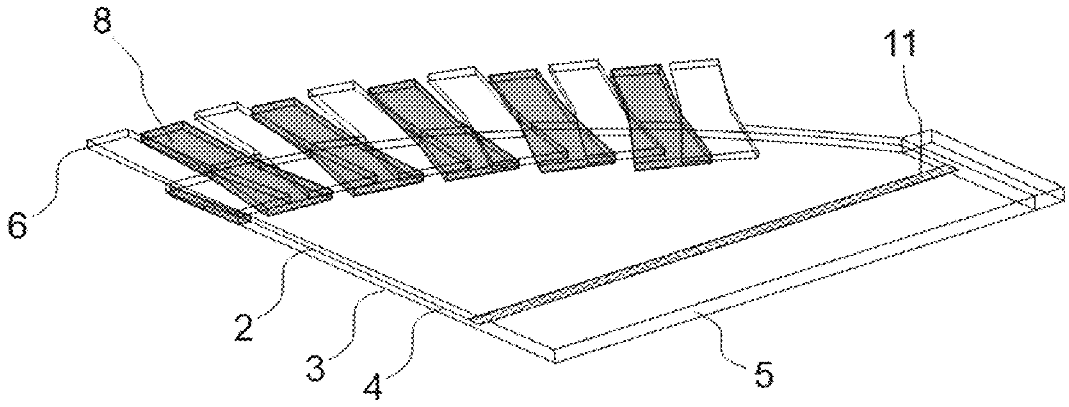
FIG. 5 illustrates a perspective view of the quasi-optical beam former, cut along the line shown in FIG. 4.

According to one embodiment of the invention that is illustrated in FIGS. 4 and 5, the quasi-optical beam former comprises an upper parallel-plate waveguide 2 and a lower parallel-plate waveguide 3 that are superposed one with respect to the other. They thus share a common conductive plane 4, which forms the lower wall of the upper parallel-plate waveguide 2, and the upper wall of the lower parallel-plate waveguide 3. The upper and lower parallel-plate waveguides occupy the XY plane, and they are therefore superposed in the Z direction.

The upper and lower parallel-plate waveguides are not superposed over the entire extent of the quasi-optical beam former, but only over a portion thereof. Beyond a certain distance from the focal array of beam ports, the upper parallel-plate waveguide 2 and the lower parallel-plate waveguide 3 form, in the absence of metal plane, a common parallel-plate waveguide 5.

The quasi-optical beam former also comprises a set of upper beam ports 6 intended to feed the upper parallel-plate waveguide 2. The upper beam ports 6 are located in the plane of the upper parallel-plate waveguide 2.

In the same way, the quasi-optical beam former comprises a set of lower beam ports 8 intended to feed the lower parallel-plate waveguide 3. The lower beam ports 8 are located in the plane of the lower parallel-plate waveguide 3.

The quasi-optical beam former also comprises a set of network ports (7, 9), which may be placed in one and the same level, in order to transmit signals to the radiating elements.

The upper beam ports 6 and the lower beam ports 8 are located in the focal plane of the quasi-optical device 10. Each beam port comprises a source for generating a TEM wave (TEM standing for Transverse ElectroMagnetic), a TE wave (TE standing for Transverse Electric) or indeed both.

According to one embodiment of the invention, the sources are horn antennas, in particular H-plane horn antennas, which are particularly suitable for performing beam reconfiguration, each source of the beam port defining one spot-beam feed.

However, it will be noted that other well-known types of sources may be used (monopole arrays, transitions between micro-strips and parallel-plate guide, transitions between striplines and parallel-plate guide, transitions between coaxial guides and parallel-plate guide, etc.). Horn antennas may easily be designed and manufactured in PCB technology.

According to another embodiment, the quasi-optical beam former comprises a single beam-port stage, one set of upper network ports 7, and one set of lower network ports 9.

At the junction between the upper waveguide and the lower waveguide on the one hand, and the common waveguide on the other hand, a resistive film is placed in the continuity of the conductive plane that separates the upper waveguide and the lower waveguide, as illustrated in FIG. 5.

The resistive film is a layer that has a resistivity squared such that when current lines pass through the resistive film, a certain amount of energy is dissipated, this decreasing coupling between the beam ports.

In embodiments, the resistive film 11 may be closer to the beam ports than the quasi-optical device, or in contrast be closer to the quasi-optical device than the beam ports. Similarly, the resistive film may be relatively wide (width corresponding to the dimension in the longitudinal direction X).

As a variant, the resistive film 11 may be adjacent to the beam ports and/or adjacent to the network ports, i.e. in direct connection with these ports. In this case, the beam former comprises only a single parallel-plate waveguide, in one and only one stage.

It is possible to define the dimensions and characteristics of the resistive film 11 by means of empirical measurements carried out during a simulating phase or during a computing phase, so as to obtain the desired level of decoupling between the beam ports.

The dimension of the resistive film, in the direction of propagation X, may advantageously be larger than or equal to $\lambda_g/4$, where $\lambda_g$ is the wavelength guided in the quasi-optical beam former 1.

The resistive film may for example comprise a nickel-phosphorus alloy.

It is advantageous to place the resistive film 11 over the entire length of the metal plane 4, in the transverse direction Y, so as to dissipate energy even for the beam ports that are most off-centre, with respect to the main axis of the quasi-optical device.

The presence of the resistive film, in the continuity of the conductive plane (either directly in contact with the beam ports or network ports, or at the junction between the superposed guides and the common parallel-plate waveguide), allows losses related to overlap of the beams to be minimized.

Moreover, the presence of the resistive film near (adjacent to) the superposed beam ports (or near the junction with a common parallel-plate waveguide) allows space to be freed to accommodate the size of the sources, so that they may perfectly irradiate the network ports, with an apodized pattern, also allowing side lobes to be decreased. Sources of larger size also allow the amplitude of the field on the edges of the quasi-optical beam former to be limited, and parasitic reflections therefrom to be minimized.

According to one embodiment of the invention, the beam ports (6, 8) and network ports (7, 9) are superposed in at least two stages (33, 34).

Figure 6:
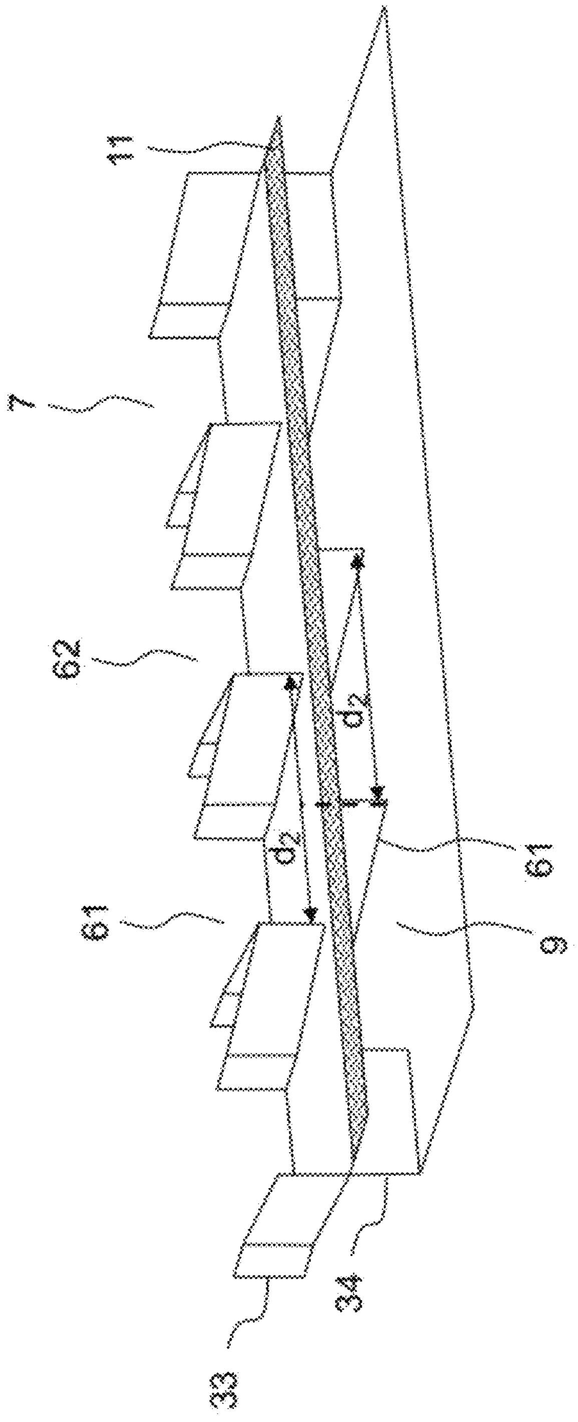
FIG. 6 illustrates a perspective view of one embodiment of the port arrangement of the quasi-optical beam former according to the invention, in which the ports are shifted with respect to one another.

According to another embodiment, illustrated in FIG. 6, the upper beam ports 6 and the lower beam ports 8 may be shifted with respect to each other in the transverse direction Y, by a predefined distance. The shift is therefore in the focal plane of the quasi-optical device 10.

The predefined distance is advantageously equal to the width of the beam port divided by the number of stages (33, 34) of beam ports, this allowing a compact array of beam ports to be obtained.

Thus, as illustrated in FIG. 6, for a beam former comprising two stages (33, 34), the predefined distance is equal to a half-width of the beam port ($d_2/2$, $d_2$ corresponding to the width of one beam port) and the centre of an upper beam port coincides with the junction between two lower beam ports, and vice versa.

Figure 7:
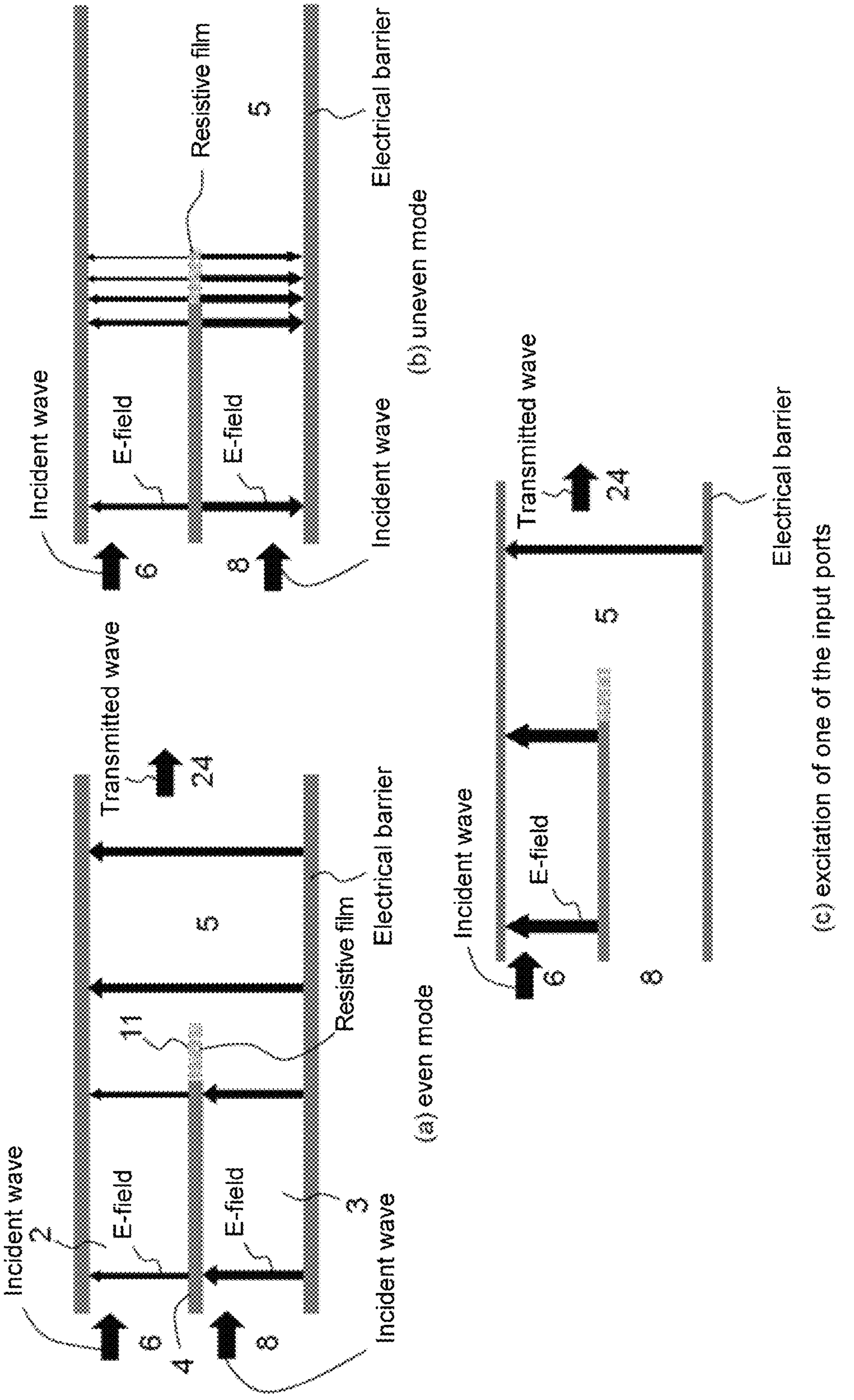
FIG. 7 illustrates a plurality of schematic representations of the operation of an E-plane combiner according to one embodiment of the invention.

FIG. 7 illustrates, schematically, the operation of the quasi-optical beam former according to the invention, at the junction between the upper parallel-plate waveguide 2 and the lower parallel-plate waveguide 3 on the one hand, and the common parallel-plate waveguide 5 on the other hand.

The resistive film 11 makes it possible to isolate the upper and lower beam ports 6, 8 and to obtain, at the output port 24, which is located in the common parallel-plate waveguide 5, a summation without loss of the signals delivered by the input beam ports when said signals are in phase and of same amplitude (schematic (a) in FIG. 7).

Specifically, in the balanced (or even) mode, the electric potential on either side of the resistive film 11 being identical, there is no current line created in the resistive part.

In contrast, in the case of an imbalance between the input signals (uneven mode, schematic (b) in FIG. 7), the resistive film 11 is subjected to current lines that lead to the absorption, through dissipation, of the imbalance between the input signals.

The resistive film 11 thus allows coupling problems that were potentially encountered in the prior art to be solved.

Figure 8:
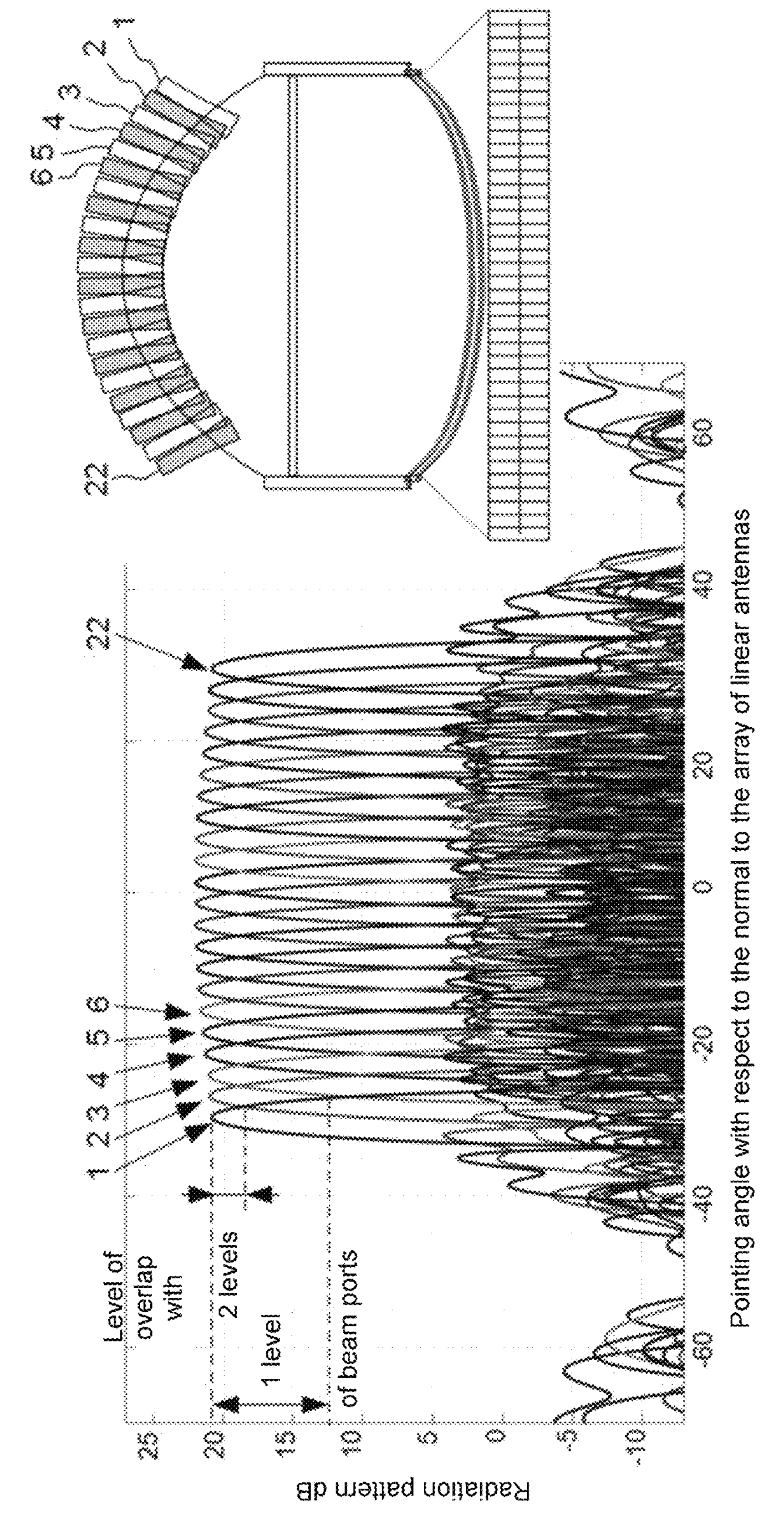
FIG. 8 illustrates the radiation pattern for various pointing angles, with a quasi-optical beam former according to one embodiment of the invention.

FIG. 8 illustrates the radiation pattern of a multibeam active antenna comprising a quasi-optical beam former according to the invention, in which the beam ports are superposed in two levels. The multibeam active antenna also comprises a radiating panel connected to the output of the beam former. The abscissa represents the pointing angle of the antenna.

The number of the beam port (1 to 22), visible in the right-hand portion of the figure in which the quasi-optical beam former is shown, corresponds to the number of the main lobe in the left-hand portion of the figure. With the quasi-optical beam former according to the invention, the level of overlap is about ⅔ dB, this greatly minimizing losses related to overlap of the beams, in comparison with the 9 dB observed when the beam ports are located in one and the same level.

The resistive film 11 thus makes it possible to match the upper and lower parallel-plate waveguides to the common parallel-plate guide, while ensuring a low degree of mutual coupling between the sources.

With such a level of overlap, the beam former according to the invention thus guarantees high-throughput transmissions between satellites and users whether the latter be stationary or rapidly moving (trains, aeroplanes, etc.).

The level of overlap may be improved by increasing the number of stages, and for example by placing the beam ports in four stages.

Figure 9:
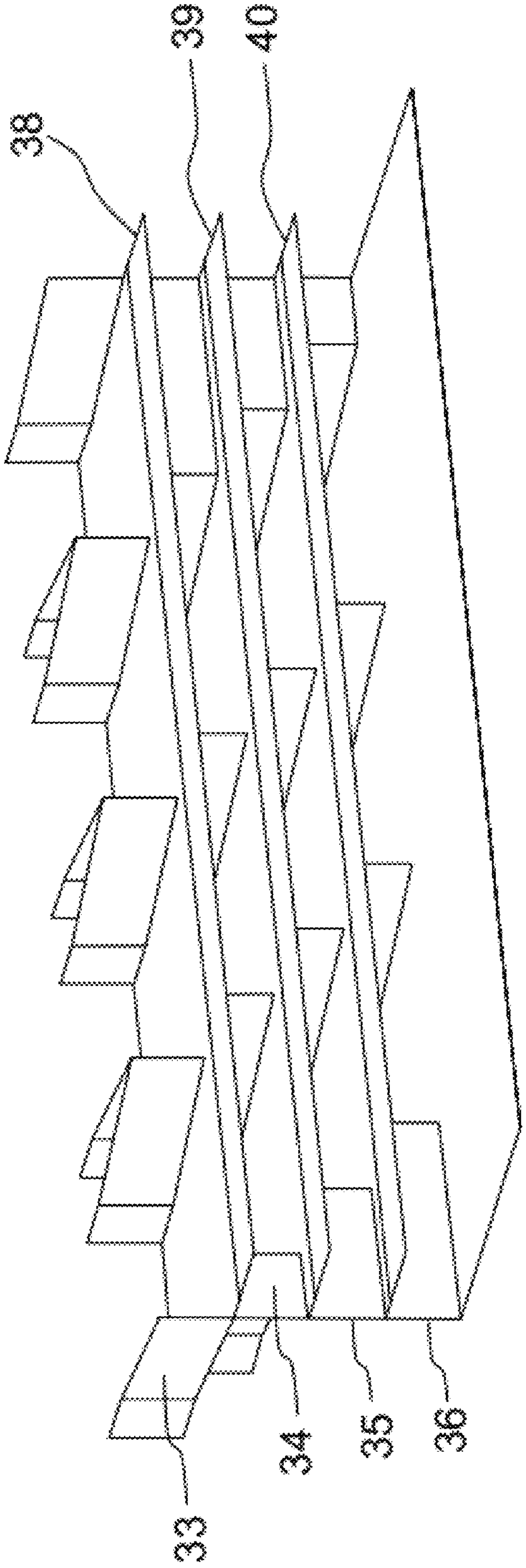
FIG. 9 illustrates a perspective view of one embodiment of the beam-port arrangement of the quasi-optical beam former according to the invention, comprising four beam-port stages.
Figure 10:
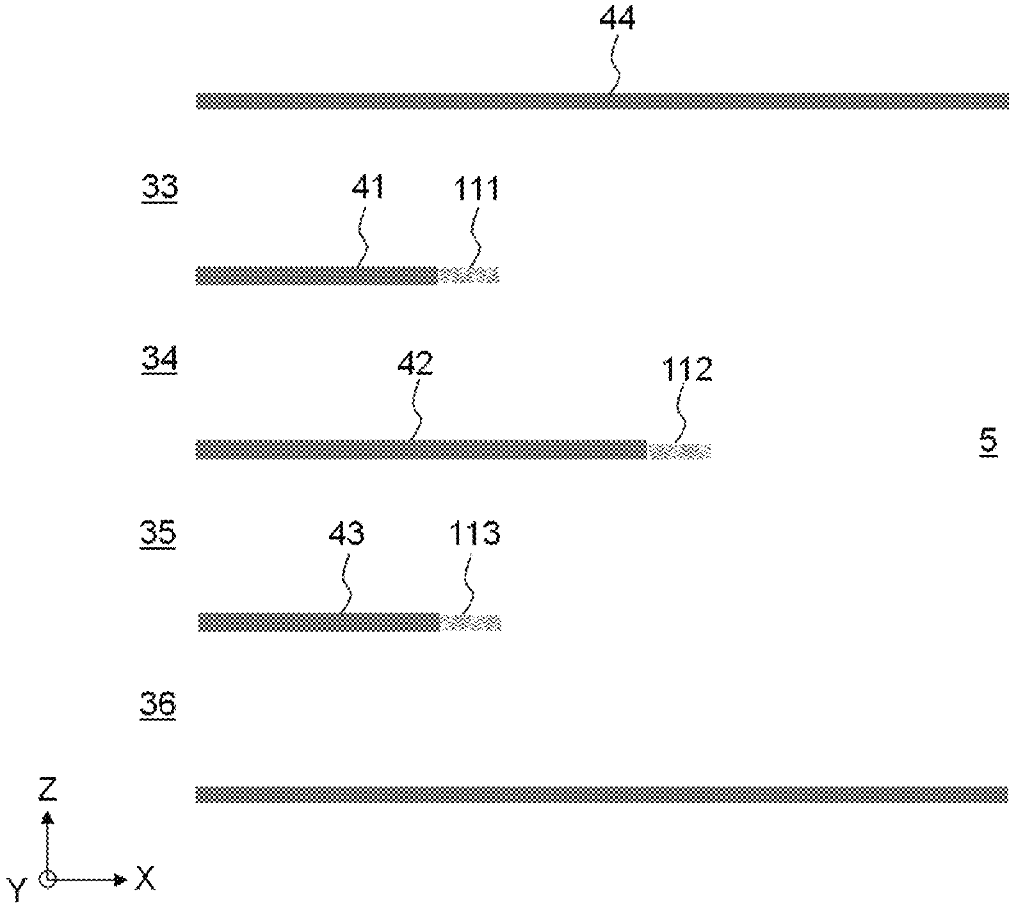
FIG. 10 illustrates a schematic representation, in the XZ plane, of one embodiment of the beam-port arrangement of the quasi-optical beam former according to the invention, comprising four beam-port stages.

Thus, according to one embodiment, illustrated in FIG. 9, the quasi-optical beam former comprises more than two stages, and in the present case four stages (33, 34, 35, 36). A resistive film (37, 38, 39) is placed between each stage, adjacently to the beam ports. The beam ports of two superposed stages may advantageously be shifted by a predefined distance equal to the width of the beam port divided by the number of stages of beam ports. Provision may also be made, in a configuration employing four or more stages, as illustrated in FIG. 10, for the length of each conductive plane (41, 42, 43) in the direction X of propagation of a wave through the quasi-optical beam former 1 to be variable from one stage to the next, so as, for example, to balance coupling between the beam ports, gradually.

For example, the conductive plane 42 located mid-height is the longest, among all the conductive planes. Considering the stages located between the upper portion 44 of the waveguide and the middle conductive plane 42, the conductive plane 41 located mid-height is attributed a length smaller than that of the middle conductive plane 42, and so on (dichotomized shortening). The resistive films (111, 112, 113) are arranged at the end of the conductive planes (41, 42, 43).

This embodiment ensures balanced coupling between the beam ports, and a good distribution of the E-field in even modes.

According to one particularly advantageous embodiment, the quasi-optical beam former according to the invention is produced in the form of a multilayer printed circuit board (PCB). Specifically, the permittivity $\varepsilon_r$ of the dielectrics integrated into the beam former allows the wavelength guided inside the quasi-optical beam former to be decreased by a factor $\sqrt{\varepsilon_r}$, and the dimensions of the beam former to be decreased by the same factor. The quasi-optical device 10 is integrated into a parallel-plate guide filled with dielectric, and the beam ports may be produced in SIW technology (SIW standing for Substrate Integrated Waveguide).

The process for manufacturing the quasi-optical beam former thus comprises a step of etching the resistive film, in the locations where the resistive film is provided. The technique for manufacturing a PCB quasi-optical beam former lends itself particularly well to the addition of a resistive film to the beam former.

Quasi-optical beam formers in multilayer-PCB format may lead to higher losses than beam formers in metal-guide format. Nevertheless, in active antennas, the amplifiers are integrated into the radiating panel (all the amplifiers contribute to the formation of the beam); they are therefore not located before the beam former, and hence there is more tolerance to losses.

Figure 11:
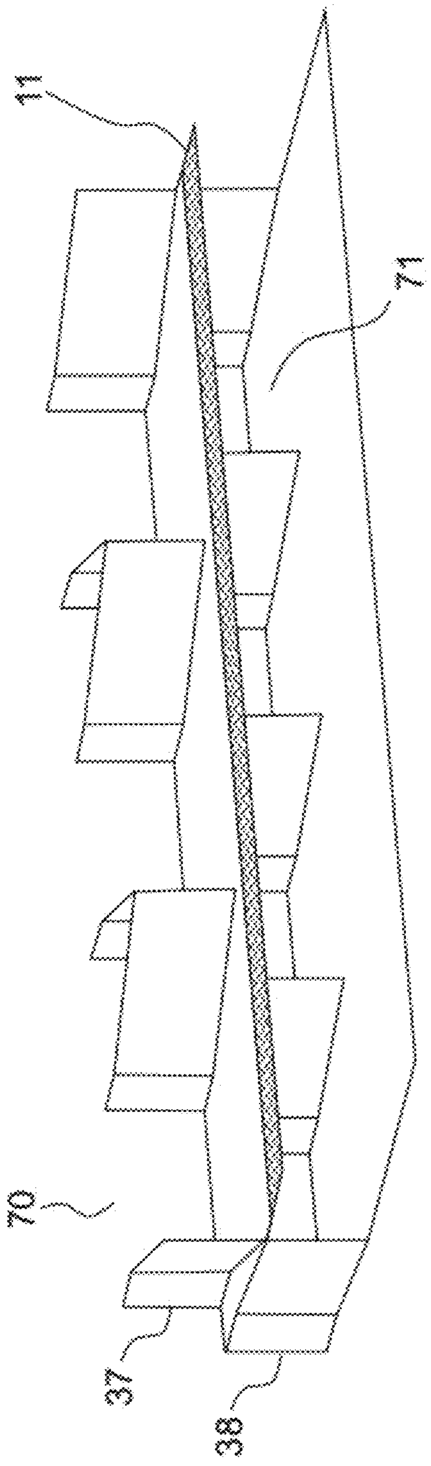
FIG. 11 illustrates a perspective view of one embodiment of the beam-port arrangement, in which the beam ports have various dimensions.

According to one embodiment, illustrated in FIG. 11, the dimensions of the beam ports differ from one stage to the next. In this case, the number of beam ports differs from one stage to the next. For example, in FIG. 11, stage 37 comprises three beam ports 70, and stage 38 comprises four beam ports 71. The beam ports of stage 37 are wider (in the transverse direction Y) than the beam ports of stage 38. A segment of resistive film 11 lies at the junction between stage 37 and stage 38, at the output of the beam ports.

The embodiment illustrated in FIG. 11 may be extended to more than two stages, and for example to four or even more stages, the length of the conductive plane remaining the same or varying from one stage to the next.

The fronts of the cylindrical waves excited by the beam ports of the quasi-optical beam former are oriented toward the centroid of the network ports. The transmitted electric field is therefore maximum at the centre of the network ports, and the strength of the electric field may decrease for ports located on the periphery. There is however a residual electric field on the edges of the quasi-optical beam former.

Figure 12:
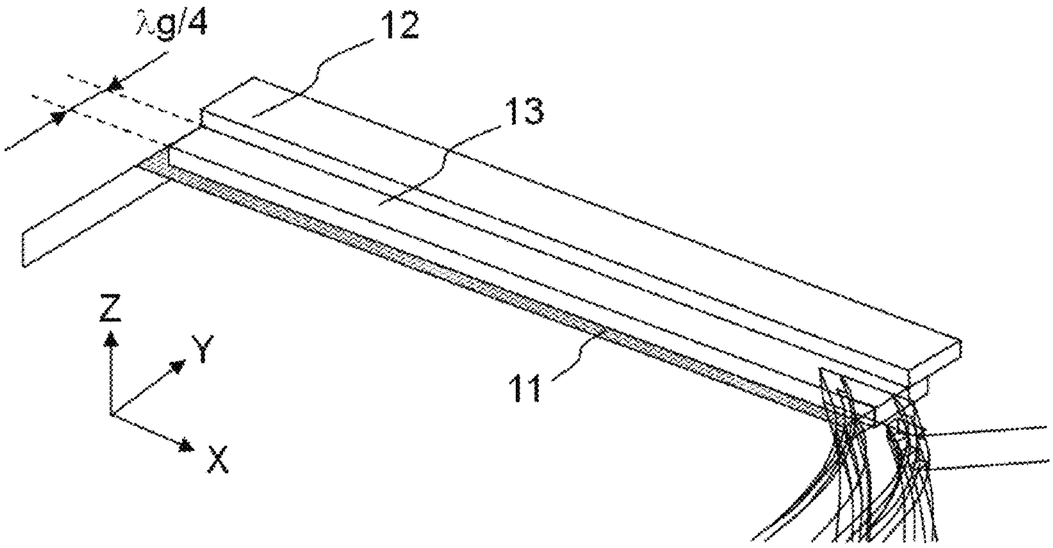
FIG. 12 illustrates a perspective view of an edge of the quasi-optical beam former according to one embodiment of the invention, comprising absorbers.

In order to decrease the residual electric field on the edges, the quasi-optical beam former, such as illustrated in FIG. 12, comprises, on its lateral edges (25, 26), a first absorbing device 12 in the upper stage 33, and a second absorbing device 13 in the lower stage 34. The lateral edges (25, 26) are the edges located in the transmission line, between the beam ports and the quasi-optical device (FIG. 4).

The absorbing devices are configured to absorb energy not transmitted between the beam ports (6, 8) and the network ports (7, 9), and thus to minimize parasitic reflections from the edges of the quasi-optical beam former.

The first absorbing device 12 and the second absorbing device 13 may extend over the entire length of the corresponding lateral edge, namely all the way between the most off-centre beam ports and the quasi-optical device. As a variant, the absorbing devices may extend from the resistive film 11 to the quasi-optical device 10 in the longitudinal direction X.

The position of the first absorbing device 12 and of the second absorbing device 13 is advantageously shifted by a distance corresponding to $\lambda_g/4$ in the transverse direction Y, where $\lambda_g$ is the wavelength guided in the quasi-optical beam former 1. The direction of the shift, i.e. which absorber is set back with respect to the other, is of no importance. Moreover, the resistive film 11 is placed between the first absorbing device 12 and the second absorbing device 13. The resistive film 11 may extend beyond the absorbing devices, in the transverse direction Y. The resistive film 11 may be placed in the continuity of the metal plane and between the first absorbing device 12 and the second absorbing device 13, as illustrated in FIG. 12.

Shifting the position of the first absorbing device 12 and of the second absorbing device 13 by a distance corresponding to λg/4 in the transverse direction Y generates a phase opposition between parasitic reflections generated by the absorbers. The signal resulting from the combination in phase opposition is absorbed by the resistive film 11.

Decreasing parasitic reflections from the lateral edges (25, 26) allows the levels of signals generating interference with the amplitude and phase relationships desired on the network ports to be limited and thus the levels of the side lobes of the antenna to be attenuated.

The absorbing devices may comprise an absorbent material, for example an epoxy foam filled with magnetic particles.

Figure 13:
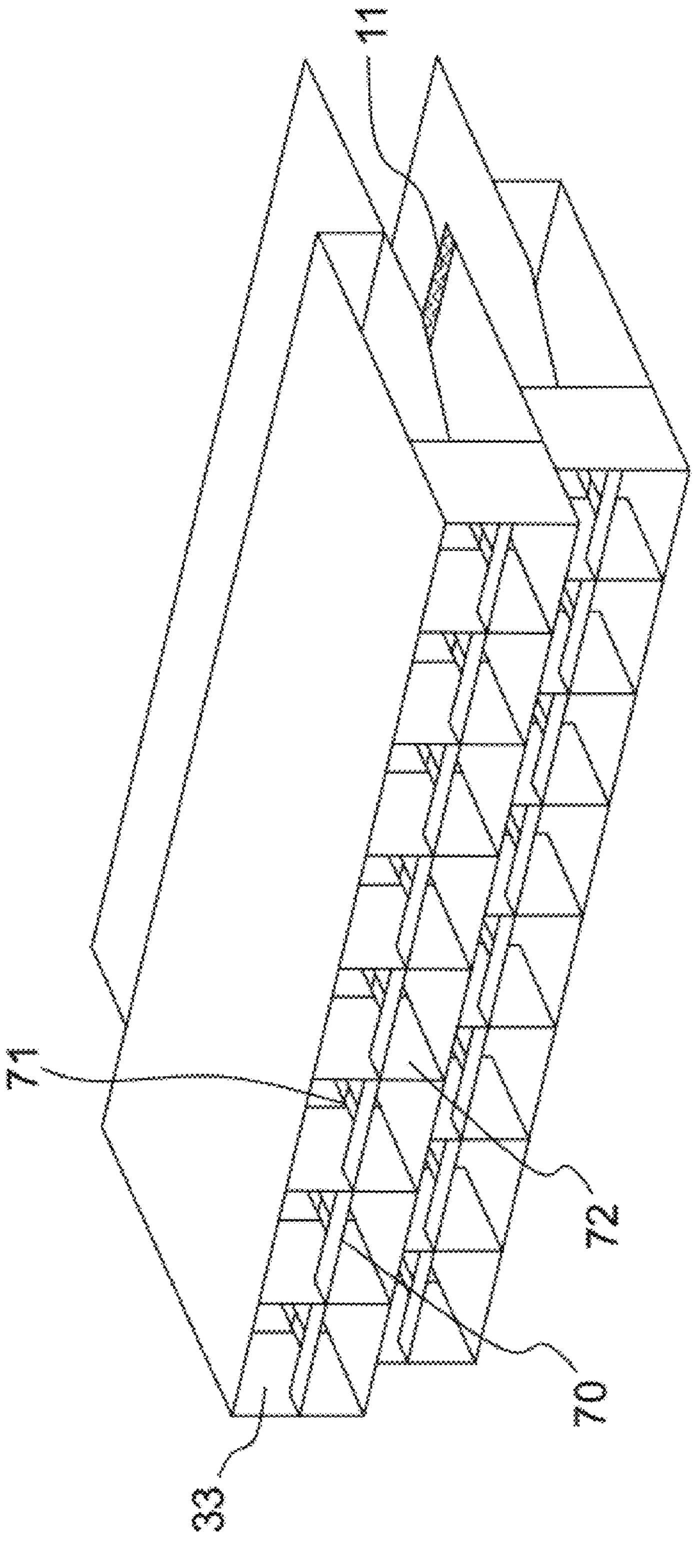
FIG. 13 illustrates a perspective view of an edge of the quasi-optical beam former according to one embodiment of the invention, comprising dummy ports.

According to one variant (illustrated in FIG. 13), the absorbing devices may comprise dummy ports 33. Each dummy port may take the form of a structure equipped with a segment of resistive film 71, with conductive sidewalls 72, and with a conductive transverse link 70 lying on either side of each sidewall.

According to another variant, the absorbing devices may comprise a plurality of dummy ports loaded with resistive loads.

Figure 14:
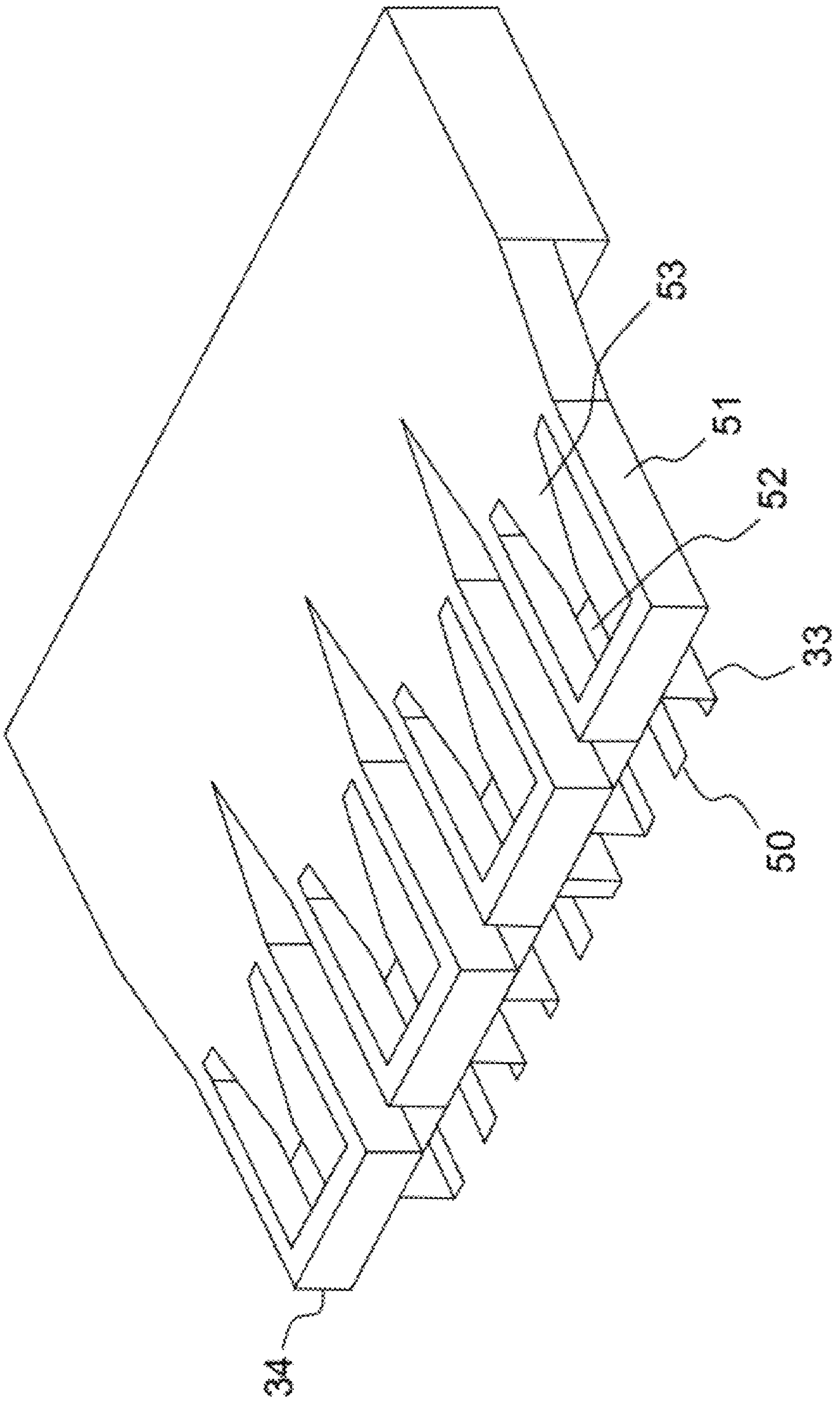
FIGS. 14, 15 and 16 illustrate various embodiments of implementation of the network ports and/or of the beam ports.

FIG. 14 illustrates a variant of arrangement of the network ports, in which variant the network ports 50 of one stage 33 are configured to all be coupled to an antenna, and the network ports 51 of an adjacent stage 34 are configured to all be coupled to a load 52 not connected to the antenna, which may be a resistive film. Coupling to a load 52 not connected to the antenna may be achieved using horn antennas connected to loads via transitions between rectangular guides and micro-strips 53.

Figure 15:
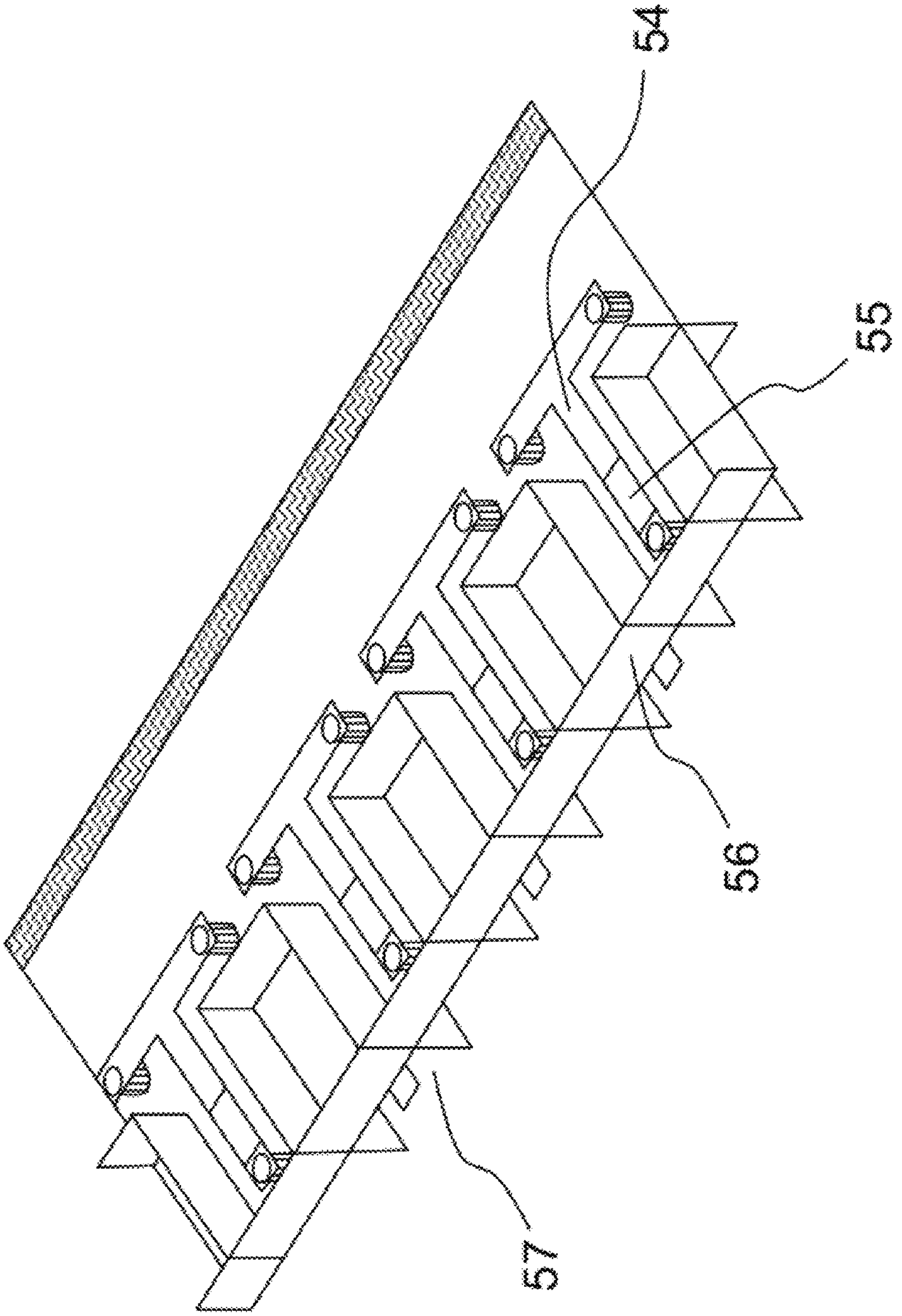

Another variant of arrangement is illustrated in FIG. 15. Network ports on two levels use transitions between parallel-plate guides and coaxial guides 54. The ports 56 of one of the two levels are connected to loads 55, which may comprise a resistive film. The ports 57 of the adjacent level are connected to the antenna.

Figure 16:
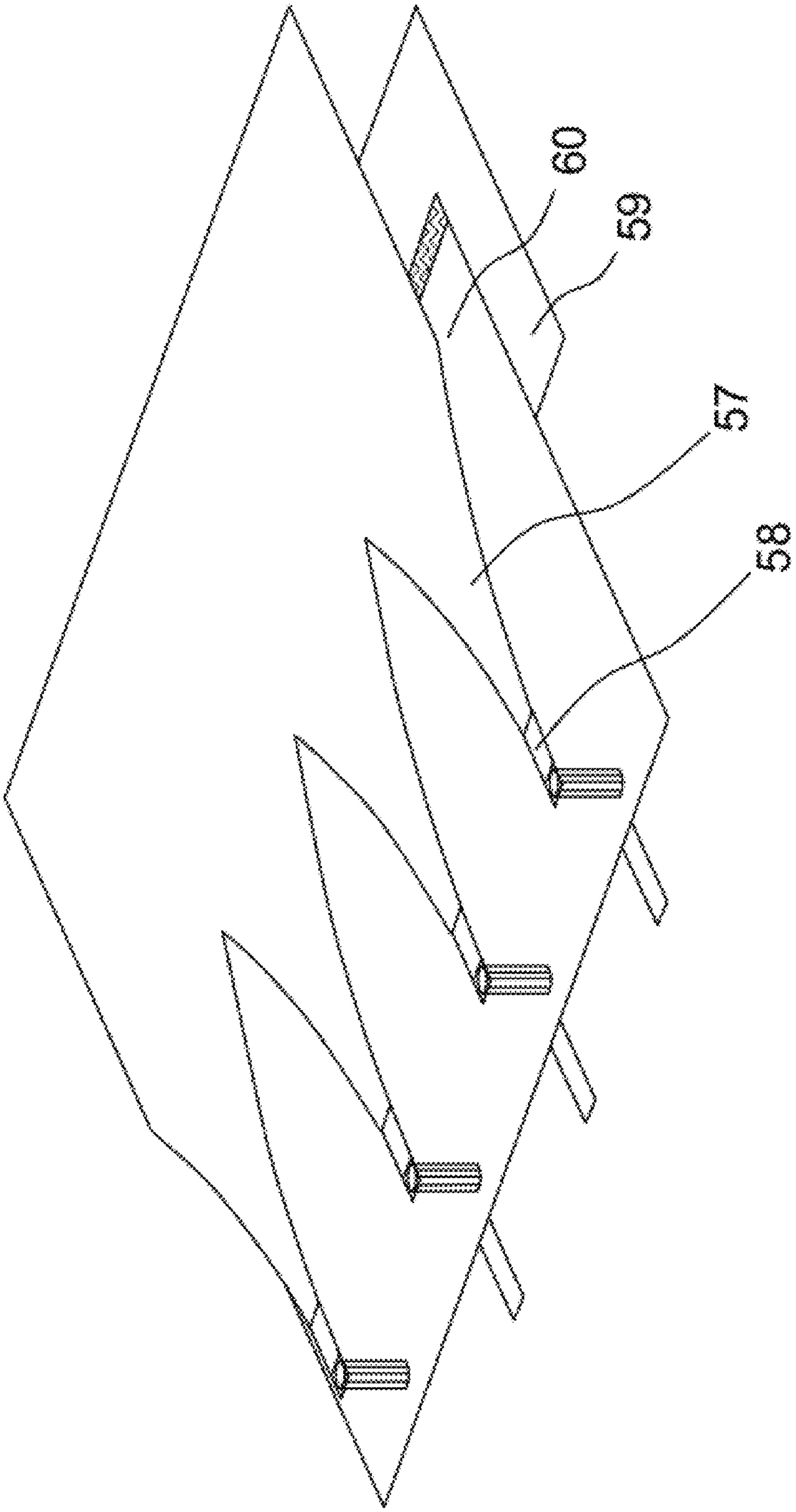

Another variant of arrangement is illustrated in FIG. 16. Network ports on two levels use transitions between parallel-plate guides and micro-strips 57. The ports 60 of one of the two levels are connected to loads 58 (resistive films for example). The ports 59 of the adjacent level are connected to the antenna.

These various types of ports and of transitions may also be used for the beam ports.

This arrangement allows parasitic reflections of high angles of incidence to be decreased and network-port widths larger than $0.6\lambda_g$ to be used. Conventionally, network ports of widths smaller than $0.6\lambda_g$ are used to limit these parasitic reflections.

Specifically, the incident waves are partially reflected from the network ports of each stage. This reflection increases with the size of the network ports and with the angle of incidence of the wave. The partial reflections from each stage are then in phase opposition when the network ports are shifted by one half-period. They are then absorbed by the resistive film.

This cancellation of partial reflection works for port widths up to $0.8\lambda_g$ or even $0.9\lambda_g$, in order to decrease the angle of incidence $\theta_{QO}$ of the waves of the quasi-optical beam former necessary to feed to the antenna.

Specifically, the angle of incidence $\theta_{QO}$ is directly related to the spacing $d_2$ between the network ports through the following equation, $\theta_{rad}$ being the pointing angle of the antenna, $d_1$ the spacing between the radiating elements of the antenna, and $\varepsilon_{r2}$ being the permittivity of the quasi-optical beam former:

$$\theta_{QO} = \sin^{-1}\left(\frac{d_1}{d_2\sqrt{\varepsilon_{r2}}}\sin\theta_{rad}\right)$$

The spacing $d_1$ between the radiating elements of the antenna is set by the constraint that requires the grating lobes of the antenna to be placed outside of the coverage of the antenna.

Typically, for an active antenna of a satellite in geostationary orbit having to operate over $\theta_{rad}=\pm 8.7°$, the spacing between the radiating elements is of the order of $3.1\lambda$ where $\lambda$ is the wavelength in vacuum.

Thus, in the case of an active antenna operating in a geostationary orbit, increasing the periodicity of the network ports from $0.6\lambda_g$ to $0.8\lambda_g$ allows the constraint on the angle of incidence of the waves inside the quasi-optical beam former to be relaxed, from 51.4° to 38.5°, which seems less critical.

This is possible as a result of use of two superposed rows of network ports spaced with a period of $0.8\lambda_g$, in combination with implementation of a shift of one half-period between the two superposed rows. Only one of the two rows of ports is then connected to the radiating elements, and the ports of the other row are connected to loads (see FIGS. 14, 15 and 16), this allowing specular reflections to be avoided.

Figure 17:
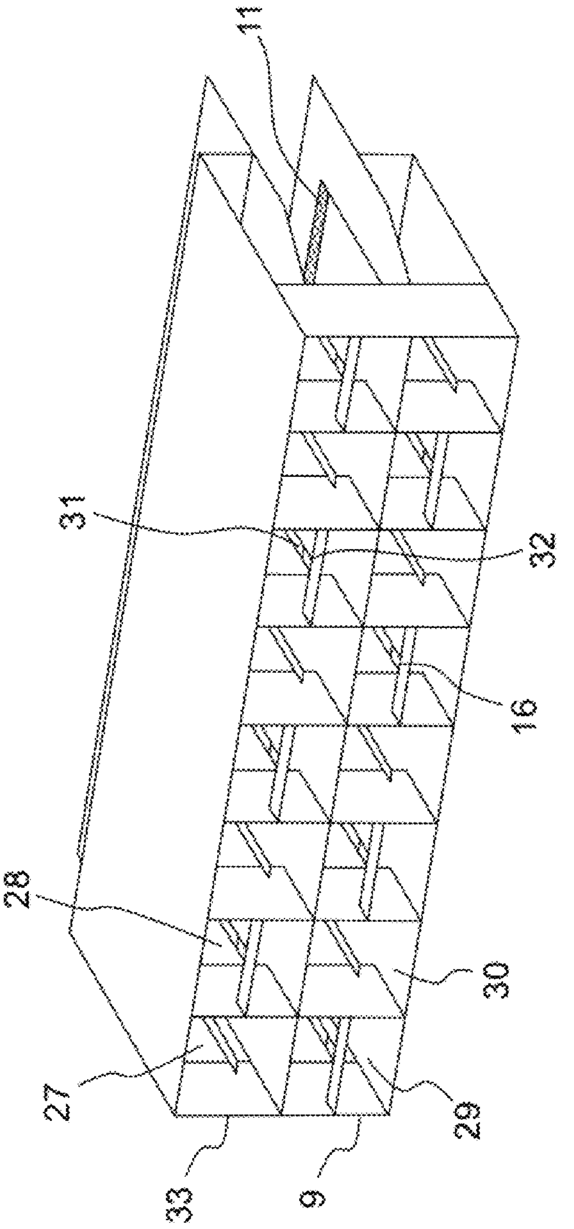
FIG. 17 illustrates a perspective view of the network ports of the quasi-optical beam former according to one embodiment of the invention, in which embodiment the network ports are alternately connected to a load not connected to the antenna.

According to another embodiment illustrated in FIG. 17, the upper and lower network ports are configured to be alternately coupled, in the transverse direction Y, to an antenna and to a load that is not connected to the antenna.

Thus, the set of upper network ports comprises in alternation an upper network port 27 connected to the antenna (not shown in FIG. 17), and a network port 28 connected to a load that is not connected to the antenna.

In the same way, the set of lower network ports comprises in alternation a lower network port 29 connected to a load that is not connected to the antenna, and a network port 30 connected to the antenna.

Considering two superposed network ports (for example ports 27 and 29, or ports 28 and 30), only one of the two ports is connected to the antenna, the other being connected to a load not connected to the antenna.

This mode of operation, which has been explained with reference to a receive antenna, is also transposable to the case of a transmit antenna. In this case, a wave incident on the network ports at an oblique angle of incidence is partially reflected in the direction of the grating lobe. The partial reflections are then converted into an uneven mode, which dies out in the resistive film.

The invention also relates to an active antenna comprising a quasi-optical beam former such as mentioned above, and a radiating panel connected to the output of the beam former.

The invention claimed is:

1. A quasi-optical beam former comprising a set of beam ports, a set of network ports, a quasi-optical device and at least one parallel-plate waveguide extending between the beam ports and the network ports, the beam ports and/or the network ports being superposed in at least two stages, each of the at least two stages being separated by a conductive plane common to two adjacent stages, wherein the quasi-optical beam former comprises a resistive film placed in the continuity of the conductive plane.

2. The quasi-optical beam former according to claim 1, comprising a plurality of superposed parallel-plate waveguides, each superposed parallel-plate waveguide being placed facing the beam ports and/or facing the network ports of a given stage, the beam former further comprising a common parallel-plate waveguide, placed in the continuity of the superposed parallel-plate waveguides, the resistive film being placed at the junction between each superposed parallel-plate waveguide and the common parallel-plate waveguide.

3. The quasi-optical beam former according to claim 1, wherein the resistive film is adjacent to the beam ports.

4. The quasi-optical beam former according to claim 1, wherein the resistive film is adjacent to the network ports.

5. The quasi-optical beam former according to claim 1, wherein, each beam port having an identical width ($d_2$) between two consecutive beam ports of the same stage, the beam ports of two adjacent superposed stages are shifted by the width of the beam port divided by the number of stages of beam ports.

6. The quasi-optical beam former according to claim 1, wherein the beam ports are superposed in at least four stages, the length of each conductive plane in the direction of propagation of a wave through the quasi-optical beam former being variable from one stage to the next.

7. The quasi-optical beam former according to claim 1, wherein the beam ports have different dimensions, from one stage to the next.

8. The quasi-optical beam former according to claim 1, wherein, each network port having an identical width between two consecutive network ports of the same stage, the network ports of two adjacent superposed levels are shifted by the width of the network port divided by the number of stages of network ports.

9. The quasi-optical beam former according to claim 1, wherein the network ports of a stage are configured to all be coupled to one antenna, and the network ports of a superposed adjacent stage are configured to all be coupled to a load not connected to the antenna.

10. The quasi-optical beam former according to claim 1, comprising, on each of the lateral edges, a plurality of absorbing devices configured to absorb energy not transmitted between the beam ports and the network ports, said absorbing devices being superposed in the at least two stages, the position of the absorbing devices being shifted by a distance corresponding to $\lambda_g/4$, where $\lambda_g$ designates the wavelength guided in the quasi-optical beam former, the resistive film being placed between the absorbing devices of two superposed stages.

11. The quasi-optical beam former according to claim 10, wherein the absorbing devices comprise dummy ports or an absorber.

12. The quasi-optical beam former according to claim 1, wherein the network ports and/or the beam ports comprise coaxial lines, coaxial guides, striplines or micro-strips.

13. The quasi-optical beam former according to claim 1, said beam former taking the form of a multilayer printed circuit board (PCB), the parallel-plate waveguide being filled with a dielectric, the beam ports being produced in SIW technology.

14. An active antenna comprising a quasi-optical beam former according to claim 1, and a plurality of radiating elements connected to the output of said beam former.

15. The active antenna according to claim 14, wherein the dimensions of the network ports are smaller than the dimensions of the radiating elements.

* * * * *